United States Patent
Hu et al.

(10) Patent No.: US 10,831,088 B2
(45) Date of Patent: Nov. 10, 2020

(54) PROJECTION DISPLAY SYSTEM WITH IMPROVED UTILIZATION RATE OF SUPPLEMENTARY LIGHT SOURCE

(71) Applicant: APPOTRONICS CORPORATION LIMITED, Guangdong (CN)

(72) Inventors: Fei Hu, Shenzhen (CN); Zuqiang Guo, Shenzhen (CN); Lin Mi, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 0 days.

(21) Appl. No.: 16/477,513

(22) PCT Filed: Apr. 20, 2017

(86) PCT No.: PCT/CN2017/081310
§ 371 (c)(1),
(2) Date: Aug. 29, 2019

(87) PCT Pub. No.: WO2018/129827
PCT Pub. Date: Jul. 19, 2018

(65) Prior Publication Data
US 2020/0162707 A1    May 21, 2020

(30) Foreign Application Priority Data
Jan. 12, 2017   (CN) .......................... 2017 1 0021717

(51) Int. Cl.
*H04N 9/31*    (2006.01)
*G03B 21/00*   (2006.01)
(Continued)

(52) U.S. Cl.
CPC ......... *G03B 21/204* (2013.01); *G02B 27/149* (2013.01); *G03B 21/008* (2013.01);
(Continued)

(58) Field of Classification Search
CPC .. H04N 9/3105; H04N 9/3114; H04N 9/3158; H04N 9/3197; H04N 9/315;
(Continued)

(56) References Cited

U.S. PATENT DOCUMENTS

| 3,676,591 A | * | 7/1972 | Nix, Jr. ................. H04N 5/7425 348/767 |
| 3,953,117 A |   | 4/1976 | Cannon |

(Continued)

FOREIGN PATENT DOCUMENTS

| CN | 101430492 A | 5/2009 |
| CN | 101576659 A | 11/2009 |

(Continued)

OTHER PUBLICATIONS

International Search Report of corresponding PCT Application No. PCT/CN2017/081310—3 pages (dated Sep. 28, 2017).

(Continued)

*Primary Examiner* — Michelle M Iacoletti
*Assistant Examiner* — Magda Cruz
(74) *Attorney, Agent, or Firm* — Knobbe, Martens, Olson & Bear, LLP

(57) ABSTRACT

A projection display system, comprising: a first light source for emitting a first light; a first light modulation system for receiving the first light and modulating the first light into a first image light; a supplementary light source for at least emitting a supplementary light, wherein a spectrum of the first light comprises a spectrum of the supplementary light; a second light modulation system for receiving the supplementary light and modulating the supplementary light into a supplementary image light; a light combining device for combining the first image light and the supplementary image light, the beam cross-sectional area of the first image light being greater than the beam cross-sectional area of the (Continued)

supplementary image light at the light combining position; and a projection lens system for causing the first image light and the supplementary image light to form coincident images at a predetermined position.

17 Claims, 4 Drawing Sheets

(51) Int. Cl.
 *G02B 27/14* (2006.01)
 *G03B 21/20* (2006.01)
(52) U.S. Cl.
 CPC ......... *H04N 9/3105* (2013.01); *H04N 9/3114* (2013.01); *H04N 9/3158* (2013.01); *H04N 9/3197* (2013.01)
(58) Field of Classification Search
 CPC .. H04N 9/3161; H04N 9/3164; G02B 27/149; G02B 26/008; G03B 21/008; G03B 21/204; G03B 21/2006; G03B 21/2066; G03B 21/005
 See application file for complete search history.

(56) References Cited

U.S. PATENT DOCUMENTS

2001/0053078 A1* 12/2001 Ishikawa ............ G02B 26/0841
 362/238
2002/0154277 A1 10/2002 Mukawa et al.
2017/0019645 A1* 1/2017 Li ........................ G02B 26/008
2017/0048502 A1* 2/2017 Guo ..................... G03B 21/204

FOREIGN PATENT DOCUMENTS

| | | |
|---|---|---|
| CN | 101576660 A | 11/2009 |
| CN | 102722073 A | 10/2012 |
| CN | 105204279 A | 12/2015 |
| EP | 2161704 A1 | 3/2010 |
| EP | 2793079 A1 * | 10/2014 ........... G03B 21/204 |

OTHER PUBLICATIONS

Extended European Search Report issued in application No. 17891321.6 dated Jul. 16, 2020.

* cited by examiner

PROJECTION DISPLAY SYSTEM WITH IMPROVED UTILIZATION RATE OF SUPPLEMENTARY LIGHT SOURCE

CROSS-REFERENCE TO RELATED APPLICATIONS

The present application is a national phase application of International Application No. PCT/CN2017/081310 filed on Apr. 20, 2017, which claims priority to Chinese Patent Application No. 201710021717.8, filed on Jan. 12, 2017, the contents of each of which are incorporated herein by reference in its entirety and made a part of this specification.

TECHNICAL FIELD

The present disclosure relates to the field of display technologies, and more particularly, to a projection display system.

BACKGROUND

At present, in the projection display industry, many light sources use a technique in which a laser light excites phosphor to obtain a high-brightness multi-color light. A typical technical solution is to use a blue-violet laser light to excite yellow phosphor to obtain a white light. However, an emission spectrum of the yellow phosphor at present is weak in the red color segment, so that the white light balance point deviates from the Planck black body curve and a greenish white color is presented.

Technical Problem

In order to avoid the white balance problem, a method is provided in the prior art in which the excess green light component in the synthesized white light is filtered out, so that the white balance point returns back to the Planck black body curve, thereby solving the white balance problem. However, as for this method, since the green light component is filtered out, the light extraction efficiency of the white light source is lowered, which is disadvantageous for improving brightness of a projection display device.

Another prior art provides a method in which a red laser light is added to a yellow fluorescence or a red fluorescence to solve the white balance problem of a white light source. For example, a laser light with a spectral coverage of around 638 nm or 650 nm is supplemented to the yellow fluorescence in order to increase the red component in the combined light, thereby solving the white balance problem. As shown in FIG. 1, the light source system includes a blue excitation light source 11, a red supplementary light source 12, a light splitting filter 13 having a central region and an edge region, a fluorescent color wheel 14, a light condensing lens 15, and a light homogenizing device 16. The central region of the light splitting filter 13 transmits a blue light and a red light and reflects a green light, and the edge region reflects the red light, the green light, and the blue light. Thus, the blue excitation light emitted by the blue laser light source 11 and the red light emitted by the red supplementary light source 12 are transmitted via the central region of the light splitting filter 13 to the color wheel 14. The yellow phosphor on the fluorescent color wheel 14 absorbs the blue excitation light while scattering the red light, thereby emitting yellow fluorescence and a scattered red light. The yellow fluorescence and the red light are incident on the light splitting filter 13. The light incident on the edge region is reflected and then concentrated by the light condensing lens 15 to be incident on the light homogenizing device 16, and only a portion of the green light in the yellow fluorescence incident on the central region is reflected and then concentrated by the light condensing lens 15 to be incident on the light homogenizing device 16, while the red light in the yellow fluorescence and the scattered red light are transmitted through the central region and are lost.

In this prior art, the red light emitted by the red supplementary light source losses about 5%-10% due to being scattered by the fluorescent material, losses about 10% in the collection process after the Lambertian light distribution is formed, and losses about 10% due to being transmitted by the central region of the light splitting filter into the non-projection light path, such that the red light emitted by the red supplementary light source has a relatively large loss and the light utilization rate of the red light is relatively low, which is about 60-70%. Since the red light source is of relatively high cost and has relatively high requirements on heat dissipation, the low utilization rate of the red light will result in a substantial increase in cost; in the same way, in other technical solutions, similar to the adding manner of adding the red light source described above, a method of adding a green light source to the light source will be adopted in order to obtain a better green light, and the problem of low utilization rate also exist.

Therefore, in view of the deficiencies in the prior art, it is urgent to propose a technical solution capable of improving the utilization rate of a supplementary light source.

SUMMARY

Solution to problem

In view of the defect of low utilization rate of a supplementary light in the prior art described above, the present disclosure provides a projection display system, including: a first light source configured to emit a first light; a first light modulation system configured to receive the first light and modulate the first light into a first image light; a supplementary light source configured to emit at least a supplementary light, a spectrum of the first light including a spectrum of the supplementary light; a second light modulation system configured to receive the supplementary light and modulate the supplementary light into a supplementary image light; a light combining device positioned in an emergent light path of the first light modulation system and an emergent light path of the second light modulation system, and configured to combine the first image light and the supplementary image light, a beam cross-sectional area of the first image light being greater than a beam cross-sectional area of the supplementary image light at a light combining position; and a projection lens system positioned in the emergent light path of the first light modulation system and the emergent light path of the second light modulation system, and configured to image and overlap the first image light and the supplementary image light at a predetermined position.

In one embodiment, a divergence angle of the supplementary light at an incident position of the second light modulation system is smaller than a divergence angle of the first light at an incident position of the first light modulation system.

In one embodiment, the supplementary light source is a laser light source.

In one embodiment, the divergence angle of the supplementary light at the incident position of the second light modulation system is smaller than ⅕ of the divergence angle of the first light at the incident position of the first light modulation system.

In one embodiment, the first light is a sequential light having a spectrum that changes with time.

In one embodiment, the first light is a non-sequential light having a spectrum that does not change with time.

In one embodiment, the first light is a white light, color coordinates of the white light deviate from the black body locus, and the supplementary light is a red light or a green light.

In one embodiment, the supplementary light source and the first light source are synchronously turned on and off when the projection display system is in a working state.

In one embodiment, the first light modulation system is a light modulation system of a digital micromirror device type, and the second light modulation system is a light modulation system of a liquid crystal light valve type; or the second light modulation system is a light modulation system of the digital micromirror device type, and the first light modulation system is a light modulation system of the liquid crystal light valve type.

In one embodiment, the projection lens system includes a first projection lens positioned in the emergent light path of the first light modulation system and configured to image the first image light to the predetermined position; the projection lens system further includes a second projection lens positioned in the emergent light path of the second light modulation system and configured to image the supplementary image light to the predetermined position; and the light combining device is positioned in an emergent light path of the first projection lens and an emergent light path of the second projection lens.

In one embodiment, a maximum diameter of the first projection lens is greater than a maximum diameter of the second projection lens.

In one embodiment, the projection lens system includes a third projection lens positioned in an emergent light path of the light combining device and configured to image the first image light and the supplementary image light to the predetermined position.

In one embodiment, the projection lens system includes a first front group lens, a second front group lens and a rear group lens; the first front group lens and the rear group lens constitute a first lens that is positioned in the emergent light path of the first light modulation system and configured to image the first image light to the predetermined position; the second front group lens and the rear group lens constitute a second lens that is positioned in the emergent light path of the second light modulation system and configured to image the supplementary image light to the predetermined position.

In one embodiment, the light combining device is positioned between the first front group lens and the rear group lens and also between the second front group lens and the rear group lens, and the light combining device is positioned at an aperture stop position of the first lens and the second lens.

In one embodiment, the light combining device is a regionally coated light splitter and includes a first region and a second region, the first image light is incident on both the first region and the second region, and the supplementary image light is incident on the first region; and the second region is configured to transmit the first image light, the first region is configured to reflect the supplementary image light and transmit at least a portion of the first image light, and a spectrum of the first image light transmitted by the first region does not overlap with a spectrum of the supplementary image light; or the second region is configured to reflect the first image light, the first region is configured to transmit the supplementary image light and reflect at least a portion of the first image light, and a spectrum of the first image light reflected by the first region does not overlap with the spectrum of the supplementary image light.

In one embodiment, during display of one frame of image, the first light modulation system is configured to modulate a red light, a green light and a blue light respectively according to image data of the frame of image, and the second light modulation system is configured to modulate the supplementary light based on image data associated with a color of the supplementary light in the image data of the frame of image.

In one embodiment, during display of one frame of image, modulation time of the second light modulation system for the supplementary light equals to a sum of modulation time of the first light modulation system for the first light.

Beneficial Effect

Compared with the prior art, the present disclosure includes the following beneficial effects: modulating the first light emitted by the first light source into the first image light by the first light modulation system, modulating the supplementary light emitted by the supplementary light source into the supplementary image light by the second light modulation system, then combining the first image light and the supplementary image light using the light combining device, making the beam cross-sectional area of the first image light greater than the beam cross-sectional area of the supplementary image light at the light combining position, and using the projection lens system to finally image and overlap at the predetermined position, thereby avoiding light loss of the supplementary light caused by being scattered, incomplete collection and entering the non-projection light path before reaching the screen, and thus improving the utilization rate of the supplementary light source.

DESCRIPTION OF EMBODIMENTS

Figure 1:
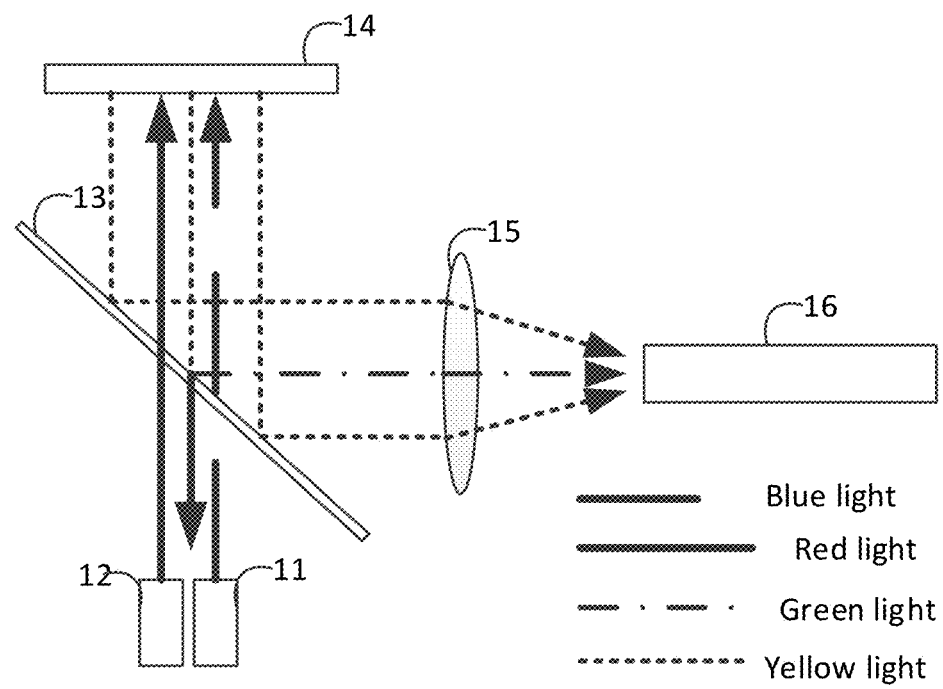
FIG. 1 is a structural schematic diagram of a projection display system in the prior art.

In the prior art, a white light having good white balance effect is obtained by additionally providing a supplementary light source, in addition to the basic main light source device. However, due to effect of the light combining position and the light combining manner of the supplementary light of the supplementary light source, the supplementary light suffers a great loss in the process of scattering, light collecting and light guiding, such that the utilization rate of the supplementary light source is low, and the output power of the supplementary light source has to be increased to obtain the white balance.

In order to improve the utilization rate of the supplementary light source, the general thought in the prior art is to start from the improvement of the device, such as reducing the scattering of the supplementary light, improving the light collecting efficiency. Unlike the prior art, the present disclosure finds a new approach and is not limited to fulfilling the light supplementary in the light path in front of the light modulator, but provides the light combining device for the first light of the main light source (the first light source) and the supplementary light of the supplementary light source in the emergent light path of the light modulator and, after the first light is modulated by the first light modulation system into the first image light and the supplementary light is modulated into the supplementary image light by the second light modulation system, combines the first image light and the supplementary image light again. In this way, the technical solution of the present disclosure directly uses the supplementary light emitted by the supplementary light source for image display, and it is unnecessary to consider the problem of inconsistent light distribution which occurs when the supplementary light and the first light are combined and thus unnecessary for the supplementary light to reach the light modulation system through the same devices as the first light, such as scattering, light collecting, light guiding devices. Conversely, since the supplementary light and the first light are combined before the light modulator in the prior art, it is necessary to require the light distribution of the combined light of the two to be uniform on the incident face of the light modulator, so that the low utilization rate of the supplementary light is inevitable.

In order to enable the first image light and the supplementary image light to be combined after the light modulation system, a suitable light combining mode needs to be selected. Since the first light forming the first image light contains the spectrum of the supplementary light, the first light and the supplementary light cannot be combined using the difference in wavelengths, otherwise there will be a large loss of this color in the first light. The present disclosure utilizes the difference in etendue of the first image light and the supplementary image light to make the two meet the following relationship at the light combining position: the beam cross-sectional area of the first image light is larger than the beam cross-sectional area of the supplementary image light, such that the supplementary image light and most of the first image light are combined into one light to be emitted. After combining, the first image light and the supplementary image light are imaged at a predetermined position (i.e., at the screen) along the same light path with the two images having the same size and the same position, so that the image required to be displayed is synthesized.

As described above, the main inventive concept of the present disclosure is to change "supplementary light in an illumination light stage" to "supplementary light in and image light stage", and provides a feasible light combining scheme in combination with this technical solution, thereby reducing the light loss of the supplementary light and improving the efficiency of the projection display system. Here, a "illumination light" refers to a light provided by a light source device of a projection display system to an incident face of a light modulator, and it has the property that the spatial distribution of the light is uniform; an "image light" refers to a light that is modulated and emitted by a light modulator, and it has the property that the spatial distribution of the light exhibits a certain pattern.

In the present disclosure, "coincident images" means that the images of the two lights imaged at the imaging position have the same size and their boundaries are coincident, instead of specifically meaning that the internal patterns of the images are coincident.

In the present disclosure, a monochromatic light refers to a color light that can be separated from a white light, such as red, orange, yellow, green, cyan, blue, and purple light, and is not limited to a light of a single frequency.

The embodiments of the present disclosure are described in detail below with reference to the accompanying drawings and embodiments.

In the present disclosure, the descriptions of "first", "second", "third" and the like are used for descriptive purposes only to make the description convenient and are not to be construed as indicating or implying their relative importance or implicitly indicating the number of technical features demonstrated. Thus, features defining "first", "second", and "third" may include at least one of the features, either explicitly or implicitly.

Figure 2:
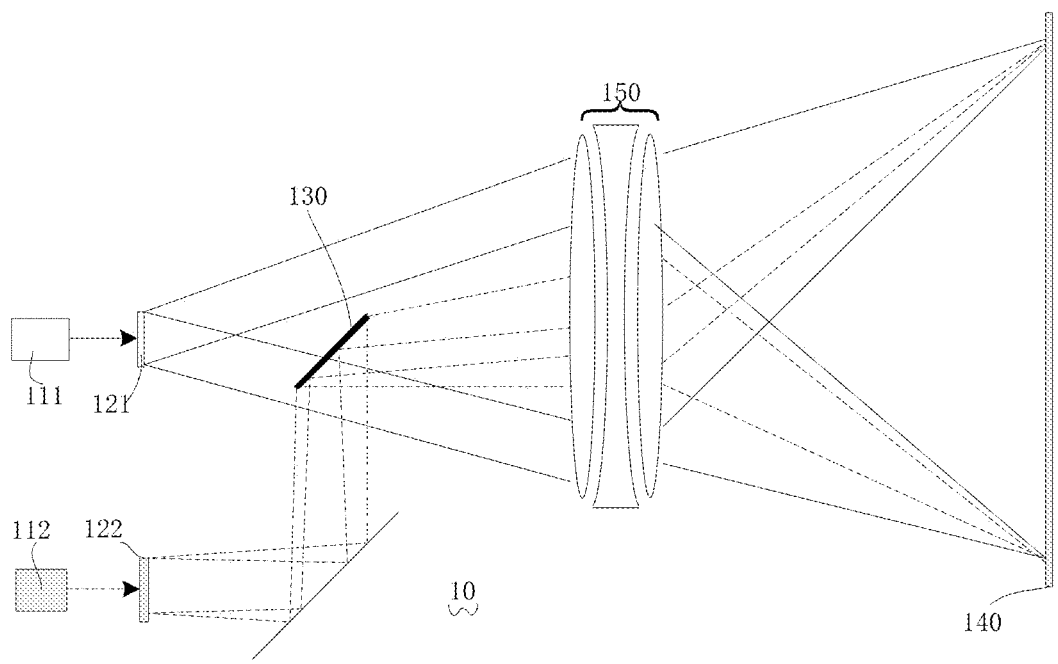
FIG. 2 is a structural schematic diagram of a projection display system according to an embodiment of the present disclosure.

Referring to FIG. 2, FIG. 2 is a structural schematic diagram of a projection display system according to an embodiment of the present disclosure. The projection display system 10 includes a first light source 111, a supplementary light source 112, a first light modulation system 121, a second light modulation system 122, a light combining device 130, and a third projection lens 150 of a projection lens system.

The first light source 111 emits a first light, and the first light is incident on the first light modulation system 121 and modulated into a first image light. The supplementary light source 112 emits a supplementary light, and the supplementary light is incident on the second light modulation system 122 and modulated into a supplementary image light. The first image light and the supplementary image light are respectively incident on the light combining device 130 along the respective emission paths, and are emitted along the same light path after being combined by the light combining device 130, and finally form, by the projection lens system, coincident images at a predetermined position (i.e., at screen 140 shown in FIG. 2), with the sizes of the images being the same and the positions being coincident.

<Light Source>

In the present embodiment, the first light source 111 is used to emit the first light, and the first light includes a red light spectrum, a green light spectrum, and a blue light spectrum. Specifically, the first light is a sequential light whose spectrum changes with time, and the first light source 111 periodically emits a red light, a green light, and a blue light in a time sequence, such that the red light, the green light and the blue light in every period are superimposed in time to display as a white light. It can be understood that the emission order of the red light, the green light and the blue light is not limited to red, green and blue, and may also be other emission orders, such as red, blue and green.

In the present embodiment, the first light source 111 is a light source in which an excitation light excites the fluorescent material and includes a light-emitting unit and a wavelength conversion device. The light-emitting unit emits the excitation light, and the excitation light is incident on the wavelength conversion device. The wavelength conversion device moves under the driving of a driving device, such that different regions on the wavelength conversion device are exposed to the irradiation of the excitation light at different time, thereby producing sequential red, green, and blue light. The light-emitting unit is a laser light source, specifically a laser diode array light source, and is composed of multiple laser diodes arranged in an array. This light source has the advantages of small divergence angle, high electro-optic conversion efficiency, good monochromaticity, and the like, and is suitable for applications such as high-brightness display. In other embodiments of the present disclosure, the light-emitting unit may also be a single laser diode or a solid laser light source and can also be an LED light source or an LED array light source, which does not affect the implementation of the technical solution of the subsequent light path system.

The wavelength conversion device includes three regions: a red light region, a green light region, and a blue light region that are used for receiving the excitation light emitted by the light-emitting unit and respectively emitting a red light, a green light and a blue light. In the present embodiment, the light emitted by the light-emitting unit is a blue light. The red light region is a red phosphor region. The green light region is a green phosphor region. The blue light region is a scattering region. The blue light emitted by the light-emitting unit is emitted after being scattered by the blue light region without changing the wavelength.

It can be understood that, in another embodiment of the present disclosure, the emitted light of the light-emitting unit may also be light of other spectra, such as but not limited to an ultraviolet light. It is possible that all the three regions of the wavelength conversion device are wavelength conversion regions for converting the wavelength of the incident light. The red light region and the green light region may also be regions respectively obtained by adding a red light filter and a green light filter to the yellow phosphor region.

In the present embodiment, the wavelength conversion device is a fluorescent color wheel that rotates about its central axis under the driving of the motor. In another embodiment of the present disclosure, the wavelength conversion device may also be a fluorescent color barrel/color cylinder, and includes multiple regions distributed around the barrel/cylinder surface. The color barrel/cylinder rotates about its axis direction, so that the multiple regions are periodically irradiated by the excitation light in a time sequence, so as to emit a sequential light. Alternatively, the wavelength conversion device may also be a fluorescent color plate, and includes multiple regions arranged sequentially in a straight-line direction. The color plate vibrates linearly in this straight-line direction, such that the multiple regions are periodically irradiated by the excitation light in a time sequence, so as to emit a sequential light.

In the present embodiment, the first light is a sequential white light composed of a red light, a green light, and a blue light. Since the red phosphor has low luminous efficiency and the red color component in the yellow light emitted by the yellow phosphor is small, the proportion of the red light in the first light is relatively small compared to the proportion of the red color in the standard white color, which results in that the white light is blue-greenish and the color coordinates of the white light deviate from the black body locus.

In the present embodiment, the supplementary light source 112 is used to at least emit a supplementary light, and the supplementary light is a monochromatic light. Specifically, the supplementary light is a red light and used for compensating for the problems that the red light component in the first light source 111 is insufficient and the color of the first light color is blue-greenish. It can be understood that in other embodiments, when the color of the white light is reddish (the color coordinates of the white light also deviate from the black body locus), the supplementary light is a green light, thereby improving the green display effect of the projection display system.

The supplementary light source 112 is a laser light source, specifically a laser diode array light source. This light source has a property of a small divergence angle compared to the above-mentioned first light source 111 in which "an excitation light excites the fluorescent material". Generally, the light emitted by the fluorescent material being excited is a light having Lambertian-distribution and having a very large light divergence angle which can be up to about 180°, whereas a light collecting lens cooperating with the fluorescent material can only collect the light of ±75° (i.e., within a range of 150°); while the light emitted by the laser light source of the supplementary light source 112 is a light having Gaussian-distribution and having a very small divergence angle. For example, the light emitted by a laser diode is an approximately elliptical light-spot with a long axis divergence angle being in a range of 15° to 40° and a short axis divergence angle being in a range of 6° to 10°, and the divergence angle of the laser diode is less than 1° after passing through a collimating lens, so that a diameter of an optical element on the subsequent light path can be relatively small and the supplementary light emitted by the supplementary light source 112 can reach and be incident on the light modulator while maintaining a small divergence angle. It can be understood that the light source type of the supplementary light source is not limited to the laser light source and may be other light sources having a relatively small divergence angle, such as an LED light source having a small divergence angle, such that the divergence angle of the supplementary light is smaller than the divergence angle of the first light at the incident position of the respectively corresponding light modulation system. Preferably, at the position where incidence occurs on the light modulation system, the divergence angle of the supplementary light is smaller than ⅕ of the divergence angle of the first light.

In the present embodiment, the red light component in the first light is generated by the wavelength conversion material and the spectral coverage is relatively large, while the spectral coverage of the red light in the supplementary light is narrow. The spectral coverage of the red light of the first light can cover the spectrum of the red light of the supplementary light, such that the spectrum of the first light can include the spectrum of the supplementary light, and thus the color of the red light of the final image does not change too much when the light is supplemented.

In one embodiment, a ratio of the red light power of the red light of the first light to the red light power of the supplementary light is about 2:1, and the ratio takes 2:1 as the median and the upper and lower floating range is ±20%. In this ratio range, a supplementary light source is both necessary and cost-effective—when the proportion of the red light in the first light is relatively small, it is proved that the red light component in the first light is too small, so that the manner of combining the first light, which is the red light, and the supplementary light is not economical, and it is better to directly use the supplementary light source as a separate light source of the red light; when the proportion of the first light which is the red light is relatively large, the supplementary light source only provides a small amount of the red light, but the cost of the light modulation system, the light path system and the like increases, making the cost performance low.

<Light Modulation System>

In the present disclosure, the projection display system includes two sets of light modulation systems: a first light modulation system 121 and a second light modulation system 122. The first light modulation system 121 is used to receive the first light and modulate the first light into the first image light; the second light modulation system 122 is used to receive the supplementary light and modulate the supplementary light into the supplementary image light.

Types of the light modulation systems include digital micromirror devices (Digital Micromirror Device, DMD) and liquid crystal light valves. The liquid crystal light valves are further divided into transmissive liquid crystal light (Liquid Crystal Display, LCD) valves and reflective liquid crystal light (Liquid Crystal on Silicon, LCOS) valves. In addition, there are spatial light modulators such as grating light valves GLV. The principle of modulating an image by any of the above light modulation systems is the prior art, and details are not described herein again.

In the present embodiment, the first light is a sequential white light of red, green, and blue. The first light modulation system includes only one light modulator, which sequentially receives the red, green, and blue light in a time sequence, and sequentially emits a red image light, a green image light, and a blue image light emitted in a time sequence after modulation. The red image light, the green image light, and the blue image light are superimposed in time as a first image light, and the first image light forms a color image in the human eye by a visual persistence effect of the human eye.

In the present disclosure, since the supplementary light is a monochromatic light, the second light modulation system requires only one light modulator to implement the modulation function. In the present embodiment, the supplementary light is a red light, and the light modulator modulates the red light after receiving it, to emit a red image light, i.e., a supplementary image light. The supplementary image light enters the human eye together with the first image light to form a color image by the visual persistence effect of the human eye.

During display of one frame of image, the first light modulation system and the second light modulation system modulate according to the same image. The first light modulation system respectively modulates the red, green and blue light according to the red image data component, the green image data component and the blue image data component of the image, while the second light modulation system modulates the supplementary red light according to the red image data component of the image (for other embodiments in which the supplementary light is other monochromatic light, modulation is performed based on the image data component associated with the color of the supplementary light), in order to ensure that the synthetized image that is emitted can be displayed correctly. In order to improve the display quality, the first light modulation system and the second light modulation system also need to achieve synchronization of the modulation by a synchronization control device.

In an implementation of the present embodiment, during one frame of image, when the first light modulation system modulates arbitrary components of the red, green and blue of the first light, the second light modulation system always modulates the supplementary light. Namely, the modulation time of the second light modulation system for the supplementary light is the sum of the modulation times of the first light modulation system for the red, green and blue light. Therefore, this technical solution greatly increases the modulation time of the second light modulation system for the supplementary light, which can improve the utilization rate of the supplementary light source and reduce the cost of the supplementary light source. Under this technical solution, when the projection display system is in a working state, the first light source and the supplementary light source are synchronously turned on and off, and both are turned on or off at the same time, to provide the first light and the supplementary light.

It can be understood that the first light source and the supplementary light source may also be not synchronously turned on and off, so that the time period during which the supplementary light source is in the on state is shorter than the time period during which the first light source is in the on state. In another implementation of the present embodiment, the second light modulation system modulates the supplementary light only when the first light modulation system modulates the red light in the first light. In another implementation of the present embodiment, the second light modulation system modulates the supplementary light when the first light modulation system modulates the two kinds of colors in the first light.

In one embodiment, the first light modulation system is a light modulation system of the digital micromirror device type, and the second light modulation system is a light modulation system of the liquid crystal light valve type. Since the light modulator of the digital micromirror type controls the brightness and darkness of an image by controlling the ratio of the on-state time period to the off-state time period of each micromirror of the light modulator in one frame, a short full-dark image may occur in one frame and result in flicker, thereby making it easy to cause visual fatigue; whereas the light modulator of the liquid crystal light valve type controls the lightness and darkness by adjusting the light transmittance, such that in theory, there is light passing in any time period, and no flicker phenomenon will occur. The present embodiment, by combining the light modulation system of the digital micromirror type with the light modulation system of the liquid crystal light valve type, avoids the flicker problem which occurs when using the light modulator of the digital micromirror device type alone, which is advantageous for improving the visual experience. In another embodiment, it is possible that the first light modulation system is a light modulation system of the liquid crystal light valve type while the second light modulation is a light modulation system of the digital micromirror device type, and the modulation principles are the same. Preferably, the light modulators of the first light modulation system and the second light modulation system have the same size and the same resolution, so that the emitted lights of the two light modulation systems can form coincident images.

<Light Combining Device>

In the present disclosure, the first image light and the supplementary image light are combined by the light combining device. Since the spectrum of the supplementary light at least partially overlaps the spectrum of the first light, if the two are combined using wavelength, it is inevitable that a portion of one light having the overlapping spectrum will be completely lost. Therefore, the present disclosure utilizes the difference in etendue, and by making the cross-sectional area of the first image light at the light combining position larger than the cross-sectional area of the supplementary light at the light combining position, the two are spatially combined and then imaged onto the screen through the same subsequent light path, such that the two image lights eventually coincide. Here, the imaging process is a process of imaging the image light of the emergent face of the light modulator onto the screen, rather than a process of imaging from the light combining position to the screen, and the light combining position is only an intermediate position in the imaging process.

In the present disclosure, in the process from the light modulation system position to the light combining position, the light loss problem is not considered, such that it can be considered that the etendue is conserved, $S_1 \sin^2 \theta_1 = S_2 \sin^2 \theta_2$. $S_1$ is the area of the emergent face of the light modulation system, and $\theta_1$ is the divergence half angle of the image light at the emergent face of the light modulation system. $S_2$ is the beam cross-sectional area of the image light at the light combining position, and $\theta_2$ is the divergence half angle of the image light at the light combining position. The above relationship is satisfied no matter in the process from the first light modulation system to the light combining device or in the process from the second light modulation system to the light combining device. The divergence half angle is half of the divergence angle.

Since the paths of the first image light and the supplementary image light are the same from the light combining device to the screen, it is better that after combining, the divergence half angles of the first image light and the supplementary image light are the same, i.e., $\theta_2$ of them need to be the same to ensure the image quality. In the case where the first light modulation system and the second light modulation system employ light modulators having the same size, $S_1$ of them are the same. Furthermore, since the divergence angle of the first light is larger than the divergence angle of the supplementary light at the incident position of the respectively corresponding light modulation system, and the divergence angle of the incident light is equal to the divergence angle of the emitted light of the light modulation system, so that the divergence half angle $\theta_1$ of the first image light at the emergent face of the first light modulation system is larger than the divergence half angle $\theta_1$ of the supplementary image light at the emergent face of the second light modulation system. In summary, according to the formula $S_1 \sin^2 \theta_1 = S_2 \sin^2 \theta_2$, in the case where the relationship between $S_1$, $\theta_1$, $\theta_2$ of the first image light and the supplementary image light is determined, it can be seen that $S_2$ of the first image light is larger than $S_2$ of the supplementary image light. Assuming that the divergence half angle of the first light is 10° at the incident position of the first light modulation system and the divergence half angle of the supplementary light is 2° (i.e., ⅕ of the former) at the incident position of the second light modulation system, then it can be obtained by calculation that at the light combining position, the beam cross-sectional area of the first image light is about 25 times the beam cross-sectional area of the supplementary image light. The larger the ratio of the emission angle of the first light to the emission angle of the supplementary light, the larger the ratio of the beam cross-sectional area of the first image light to the beam cross-sectional area of the supplementary image light.

In the process of light combining, all the supplementary image light enters the emergent light path of the projection display system, and the portion of the first image light that does not spatially overlap with the supplementary image light enters the emergent light path of the projection display system. Since the ratio of the area of the overlapping portion to the beam cross-sectional area of the first image light is very small, this process ensures that most of the light enters the emergent light path, and only a small amount of light is lost.

Referring to FIG. 2, in the present embodiment, the light combining device 130 is a light splitter and disposed in the emergent light path of the first light modulation system 121. Most of the first image light passes directly from the periphery of the light combining device 130 and enters the subsequent light path, and a small portion of the first image light is incident on and blocked by a surface of the light combining device 130, failing to enter the subsequent light path. The supplementary image light emitted from the second light modulation system 122 is reflected by a mirror (not labeled in the drawing) and then incident on another surface of the light combining device 130 and reflected so as to enter the subsequent light path. After the light combining device 130, the supplementary image light replaces part of the first image light and forms a display image at the position of the screen 140 together with the remaining and most of the first image light. It can be understood that the mirror between the second light modulation system 122 and the light combining device 130 is not essential, as long as the emergent light path of the second light modulation system 122 is changed to a straight line to the light combining device 130.

In the present disclosure, the light combining device is not limited to the light splitter, and the light combining device may also be a wavelength filter used for guiding the light having the wavelength of the supplementary light into the emergent channel; the light combining device may also be a polarization filter, and the supplementary light is polarized light, and the light combining device is used for guiding the light having the polarization state of the supplementary light into the emergent channel. It should be noted that regardless of the type of the light splitting and combining sheet used in the light combining device, it is required to satisfy the relationship of the beam cross-sectional areas of the first image light and the supplementary image light at the position of the light combining device.

<Projection Lens System>

The projection lens system is positioned in the emergent light paths of the first light modulation system and the second light modulation system. In the present embodiment, the projection lens system includes a third projection lens 150 positioned in the emergent light path of the light combining device 130 and used for imaging the combined first image light and the supplementary image light to a predetermined position (screen 140).

In the present embodiment, the first image light and the supplementary image light are combined before the third lens 150, which is advantageous for the compact structure of the projection display system and also advantageous for retrofitting and upgrading with minor modifications based on the projection display system in the prior art.

Figure 3:
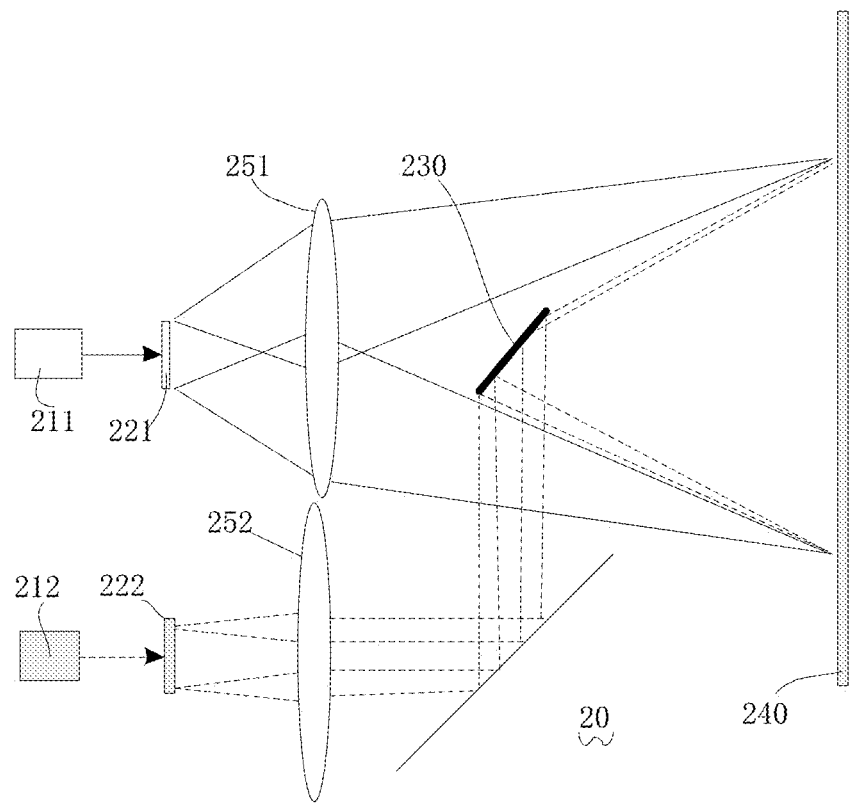
FIG. 3 is a structural schematic diagram of a projection display system according to another embodiment of the present disclosure.

Referring to FIG. 3, FIG. 3 is a structural schematic diagram of the projection display system according to another embodiment of the present disclosure. The projection display system 20 includes a first light source 211, a supplementary light source 212, a first light modulation system 221, a second light modulation system 222, a light combining device 230, and a projection lens system. The projection lens system includes a first projection lens 251 and a second projection lens 252.

In the present embodiment, the description of the first light source 211, the supplementary light source 212, the first light modulation system 221, the second light modulation system 222, and the light combining device 230 can be referred to the description in any of the above embodiments. Unlike the embodiment shown in FIG. 2, in the present embodiment, there are two projection lenses and the light combining device is disposed in the light path behind the projection lens instead of being disposed in front of the projection lens.

In the present embodiment, the first projection lens 251 is positioned in the emergent light path of the first light modulation system 221 and used for imaging the first image light to the screen 240 at a predetermined position. The second projection lens 252 is positioned in the emergent light path of the second light modulation system 222 and used for imaging the supplementary image light to the screen 240 at the predetermined position. The light combining device 230 is positioned in the emergent light paths of the first projection lens 251 and the second projection lens 252. This technical solution enables the first light source 211, the first light modulation system 221 and the first projection lens 251 to form an independent first projection display system and enables the supplementary light source 212, the second light modulation system 222 and the second projection lens 252 to form an independent second projection display system. The first projection display system and the second projection display system form one projection display system 20 through the light combining device 230. This technical solution makes the two projection display systems independent, such that it is convenient to disassemble, assemble and maintain.

In one implementation of the present embodiment, a maximum diameter of the first projection lens 251 is greater than a maximum diameter of the second projection lens 252. Since the light divergence angle of the supplementary light source 212 is small, and the light divergence angles of the incident face and the emergent face of the second light modulation system 222 are small, the propagation path of the supplementary image light is "relatively straight", so that relatively high light collection efficiency can be satisfied without requiring the second projection lens 252 to have an excessively large diameter. Therefore, the size of the second projection lens 252 can be reduced, thereby reducing the cost of the projection display system.

Figure 4:
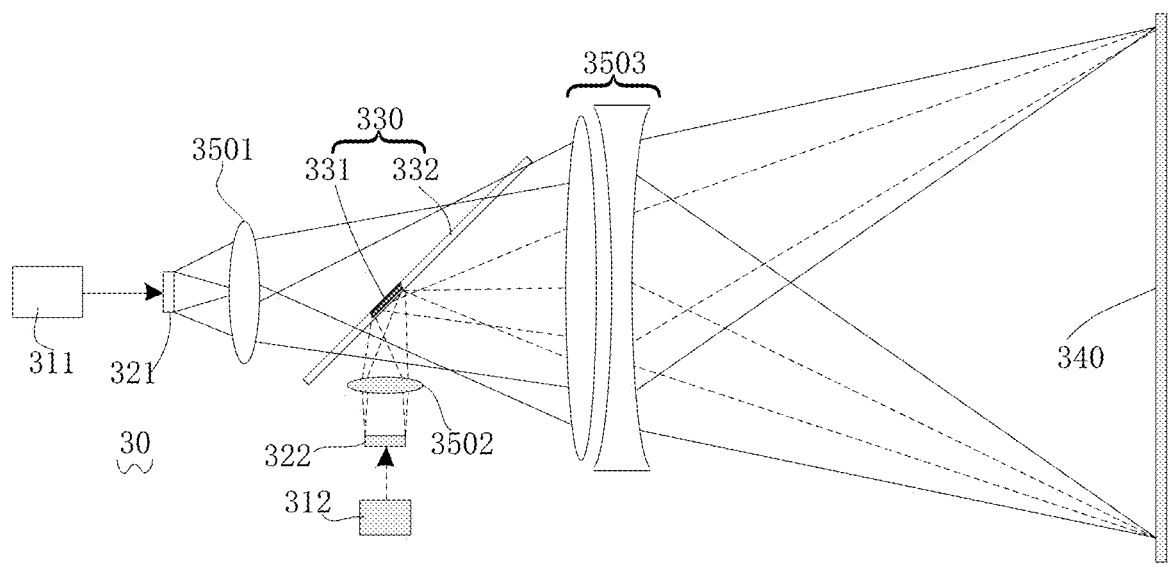
FIG. 4 is a structural schematic diagram of a projection display system according to another embodiment of the present disclosure.

Referring to FIG. 4, FIG. 4 is a structural schematic diagram of the projection display system according to another embodiment of the present disclosure. The projection display system 30 includes a first light source 311, a supplementary light source 312, a first light modulation system 321, a second light modulation system 322, a light combining device 330, and a projection lens system. The projection lens system includes a first front group lens 3501, a second front group lens 3502, and a rear group lens 3503.

In the present embodiment, the description of the first light source 311, the supplementary light source 312, the first light modulation system 321 and the second light modulation system 322 can be referred to the description in any of the above embodiments. Unlike the above embodiments in FIG. 2 and FIG. 3, the light combining device 330 is in the projection lens. Namely, the light combining device 330 is neither between the light modulation system and the projection lens nor between the projection lens and the screen, but between the incident end and the emergent end of the projection lens.

In the present embodiment, the first front group lens 3501 and the rear group lens 3503 form a first lens, and the first lens is positioned in the emergent light path of the first light modulation system 321 and used for imaging the first image light to the screen 340 at a predetermined position; the second front group lens 3502 and the rear group lens 3503 form a second lens, and the second lens is positioned in the emergent light path of the second light modulation system 322 and used for imaging the supplementary image light to the screen 340 at the predetermined position. The light combining device 330 is positioned between the first front group lens 3501 and the rear group lens 3503 and also between the second front group lens 3502 and the rear group lens 3503. This technical solution makes full use of the space of the projection lens, such that it is necessary to increase the projection length, which is advantageous for making the structure compact.

In one implementation, the light combining device 330 is in the aperture stop position of the first lens (i.e., composed of the first front group lens 3501 and the rear group lens 3503) and the second lens (i.e., composed of the second front group lens 3502 and the rear group lens 3503). At this position, the cross-sectional area of the beam is minimized, and the volume of the light combining device 330 can be reduced, which is advantageous in cost saving and miniaturization of the volume of the projection display system. Furthermore, at this position, the "face distribution" light on the emergent face of the light modulation system becomes the "angle distribution" light at the aperture stop position—at the emergent face of the light modulation system, the illumination intensity at each point on the beam cross-section varies with the position of this point in the pattern, so that the light is called "face distribution" light and the illumination intensity varies with its coordinate position on the emergent face; at the aperture stop position, each point on the beam cross-section contains the light emitted from any point on the emergent face of the light modulation system, i.e., each point on the beam cross-section contains the same image information, but for the light emitted from this point, the image information represented by the respective different emission angle is different, and different emission angles represent image lights emitted from different points on the light modulation system, so that the light is called "angle distribution" light, and the illumination intensity varies with the beam's stereo angle. In this technical solution, since the image information included in each point at the aperture stop at the light combining position is complete, the light emitted from the light combining position is projected onto the screen through the rear group lens to be re-imaged as a "face distribution" light, which will not cause loss of image information of a certain part and can improve the image display effect.

Figure 7:
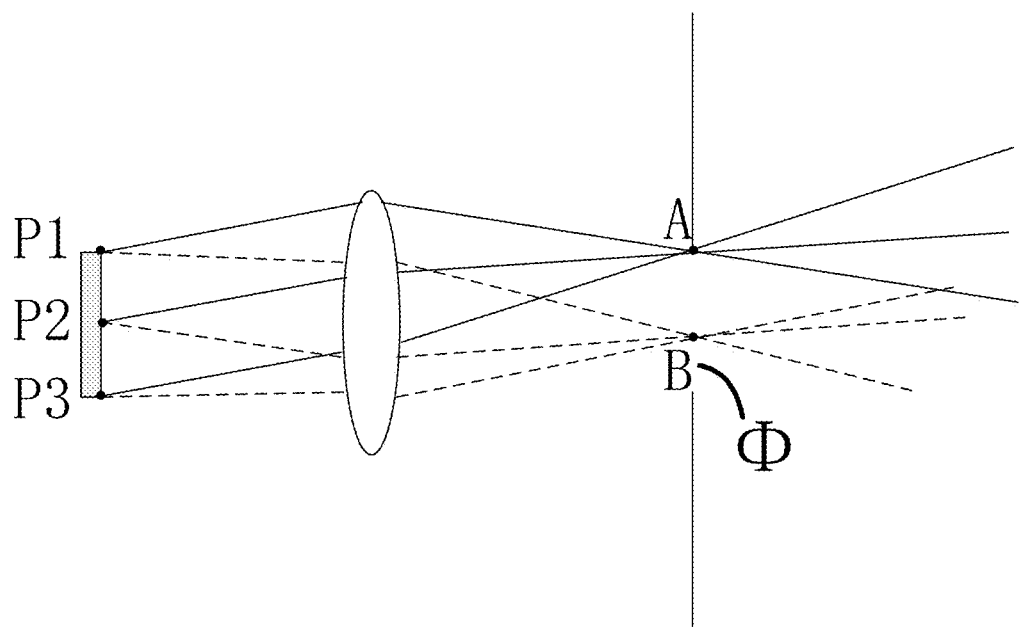
FIG. 7 is a schematic diagram showing a light distribution from a light modulator to an aperture stop.

Further, with reference to FIG. 7, FIG. 7 is a schematic diagram showing light distribution from a light modulator to an aperture stop Φ. Three points P1, P2 and P3 on the light modulator exhibit different illumination intensities depending on the image position of the displayed pattern. The light emitted by the three points P1, P2 and P3 of the light modulator in the figure reaches the aperture stop Φ through the front group lens. A and B are two arbitrary points of the position of the aperture stop Φ. Lights from P1, P2 and P3 respectively pass through both points A and B. Namely, any point on the position of the aperture stop Φ includes a portion of the light emitted from all points on the light modulator. The difference is that in the light emitted by the point A or the point B, the lights from P1, P2 and P3 respectively have different beam angles, i.e., lights at different positions on the pattern have different beam angles at a certain point of the aperture stop position Φ, and the "face distribution" becomes "angle distribution".

In the present embodiment, the light combining device is positioned at the position of the aperture stop of the first lens, such that the first image light will not miss partial information due to the blocking of the light combining device, and the image display effect is ensured; the light combining device is positioned at the position of the aperture stop of the second lens, so that the beam cross-sectional area of the supplementary image light is the smallest at the light combining position, thereby reducing the luminous flux of the first image light blocked by the light combining device, which is advantageous for the improvement of the emission brightness of the projection display system and the improvement of the image uniformity.

In the present embodiment, the light combining device 330 is a regionally coated light splitter and includes a first region 331 and a second region 332. The first image light is incident on the first region 331 and the second region 332 simultaneously, and the supplementary image light is incident only on the first region 331. The second region 332 transmits the first image light, and the second region 332 may be a transparent glass, a transparent plastic sheet, a transparent crystal, or the like. The first region 331 is a wavelength filter and used for reflecting the supplementary image light and transmitting at least a portion of the light having other wavelengths. Namely, the first region 331 transmits at least a portion of the first image light, and the spectrum of the transmitted first image light does not overlap the spectrum of the supplementary image light. In this technical solution, the first image light only loses the light that is incident on the first region 331 and having the same wavelength as the supplementary image light, such that the light utilization rate is improved.

Without doubt, it can be understood that the transflective property of the light combining device 330 can also be changed, so that the second region 332 reflects the first image light and the first region 331 transmits the supplementary image light while the first region 331 reflects at least a portion of the first image light, and the spectrum of the first image light reflected by the first region does not overlap with the spectrum of the supplementary image light.

In another implementation of the present embodiment, the supplementary light is a polarized light, and the supplementary image light is a polarized light. The first region 331 further includes a polarization wavelength splitter, and the first region 331 reflects only the light whose wavelength overlaps with the wavelength of the supplementary image light and which has the same polarization state as the supplementary image light. This technical solution further reduces the light lost by the first image light at the light combining device, which reduces the light loss and improves the image display effect.

It can be understood that the light combining device 330 used in the present embodiment may also be replaced by the light combining device in any of the above embodiments. The light combining device in any of the above embodiments may also be replaced by the light combining device 330 in the present embodiment.

Figure 5:
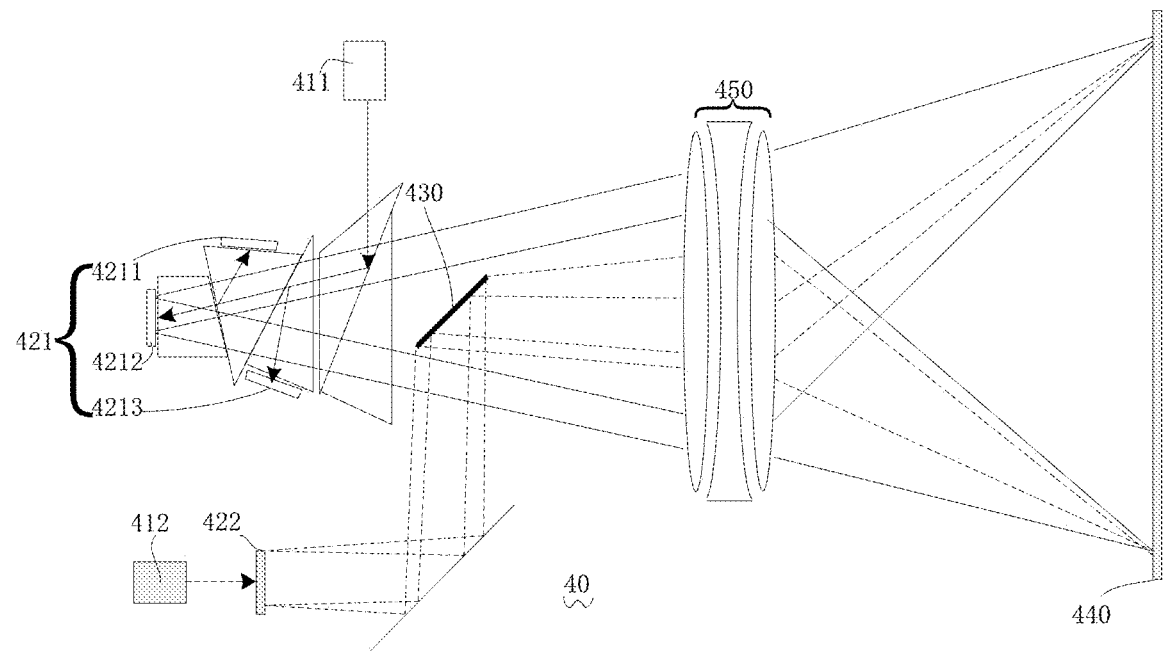
FIG. 5 is a structural schematic diagram of a projection display system according to another embodiment of the present disclosure.

Referring to FIG. 5, in another embodiment of the present disclosure, the projection display system 40 includes a first light source 411, a supplementary light source 412, a first light modulation system 421, a second light modulation system 422, and a light combining device 430. The first light modulation system 421 includes three light modulators 4211, 4212, and 4213.

Unlike the embodiment shown in FIG. 2, the first light is non-sequential light whose spectrum does not change with time, i.e., the first light is a light whose color does not change with time. In this embodiment, since the first light contains a red light spectrum, a green light spectrum and a blue light spectrum, the first light is a mixed color light. Specifically, in one implementation, the first light source is a white light source and continuously emits a white light serving as the first light whose color is constant. The white light can be obtained by a blue laser light exciting the yellow fluorescent material (such as yellow phosphor, YAG:Ce fluorescent ceramic, etc.). Specifically, the yellow light serving as the excited light generated by the yellow fluorescent material and the unabsorbed blue light serving as the excitation light are combined, and the combined light is presented as a white light. Without doubt, the obtaining of a white light is not limited to obtaining by a laser light exciting the fluorescent material.

In this embodiment, the first light modulation system 421 includes three light modulators. The projection display system further includes a light splitting element and a light combining element (the light combining element is not the light combining device 430). The light splitting element splits the first light into three light paths of a red light, a green light, and a blue light and respectively guides them into three light modulators 4211, 4212, and 4213 of the first light modulation system. The three light modulators respectively modulate the red light, the green light, and blue light into a red image light, a green image light, and a blue image light, and the three image lights are further synthesized into a first image light by the light combining element. The first image light in the embodiment shown in FIG. 2 is a "temporally combined light" superimposed in time, and the first image light in the present embodiment is a "spatially combined light" superimposed in space. In the present embodiment, the process from emitting the first light from the first light source to emitting the first image light from the first light modulation system can be referred to the prior art such as 3LCD and 3DMD, and details are not described herein again.

In the present embodiment, the first image light emitted by the first light modulation system is color image light. The color image light and the supplementary image light emitted from the second light modulation system are combined by the light combining device, and then form, on the screen along the same light path, images having the same size In the present embodiment, the first light modulation system modulates the three colors of the red light, the green light, and the blue light in the same time period, during which the second light modulation system modulates the supplementary light. The two are synchronized by the synchronization control device, and the first light source 411 and the supplementary light source 412 which supply the first light and the supplementary light are also synchronously turned on and off.

In the present embodiment, as described in the above embodiments, the first light modulation system and the second light modulation system may also be light modulation systems of different types to obtain an effect of eliminating flicker and improving image display quality.

For the color selection of the first light and the supplementary light and the setting of the light combining device 430 in the present embodiment, reference may be made to the technical solutions of any of the foregoing embodiments, and details are not described herein again. For the positional relationship between the light combining device and the lens in the present embodiment, reference may be made to the technical solutions of any of the above embodiments, and details are not described herein again.

Figure 6:
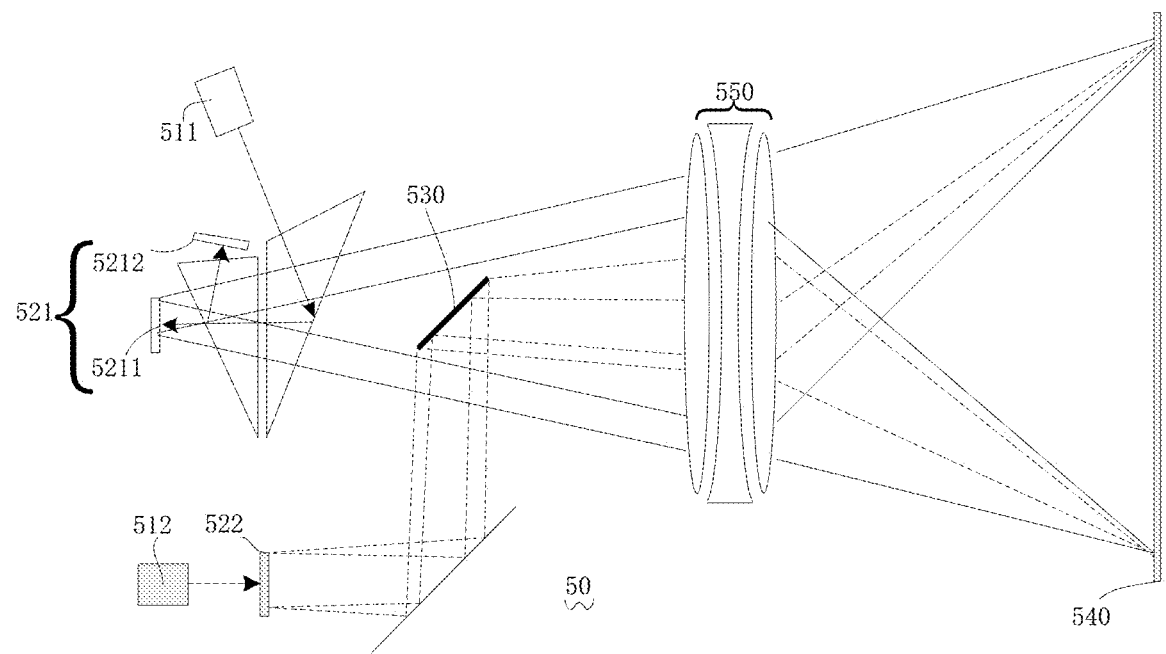
FIG. 6 is a structural schematic diagram of a projection display system according to another embodiment of the present disclosure.

Referring to FIG. 6, in another embodiment of the present disclosure, the projection display system 50 includes a first light source 511, a supplementary light source 512, a first light modulation system 521, a second light modulation system 522, and a light combining device 530. The first light modulation system 521 includes two light modulators 5211 and 5212.

Unlike the embodiment shown in FIG. 2, the first light is a sequential light of a yellow light and a blue light. Moreover, the yellow light is a broad-spectrum yellow light and includes a red light spectrum and a green light spectrum. The first light still appears as a sequential white light. Specifically, in one implementation, the first light source is a light source with a blue light exciting a fluorescent color wheel, and the fluorescent color wheel includes a yellow light region (yellow phosphor region) and a blue light region (scattering region).

In this embodiment, the first light modulation system 521 includes two light modulators 5211 and 5212. The projection display system further includes a light splitting element and a light combining element (the light combining element is not the light combining device 530). The light splitting element splits the first light into two paths, one of which is a red light and the other is a sequential light of a green light and a blue light, and guides the two light branches into the two light modulators 5211 and 5212, respectively. One light modulator modulates the red light into a red image light, and the other light modulator respectively modulates the green light and the blue light into a green image light and a blue image light in a time sequence. Then a first image light is obtained by simultaneously temporally superimposing and spatially superimposing of the three images. In the present embodiment, the process from emitting the first light by the first light source to emitting the first image light by the first light modulation system can be referred to the prior art such as 2DMD, and details are not described herein again.

In the present embodiment, the first image light emitted by the first light modulation system is a color image light. The supplementary image light emitted from the second light modulation system and the color image light are combined by the light combining device, and then form, on the screen along the same light path, images having the same size.

In the present embodiment, the first light modulation system modulates the green light and the blue light in a time-division manner. During this process, the second light modulation system can modulate the supplementary light only when the first light modulation system modulates the green light, and can also modulate the supplementary light when the first light modulation system modulates the green light and when the first light modulation system modulates the blue light. In the latter technical solution, the supplementary light source and the first light source are synchronously turned on and off, so that making the first light source and the supplementary light source be in an on state simultaneously can improve the utilization rate of the supplementary light source and reduce the cost of the supplementary light source.

In the present embodiment, as described in the above embodiments, the first light modulation system and the second light modulation system may also be light modulation systems of different types in order to obtain an effect of eliminating flicker and improving image display quality.

For the color selection of the first light and the supplementary light and the setting of the light combining device 530 in the present embodiment, reference may be made to the technical solutions of any of the foregoing embodiments, and details are not described herein again. For the positional relationship between the light combining device and the lens in the present embodiment, reference may be made to the technical solutions of any of the above embodiments, and details are not described herein again.

According to the research and summary of the time periods during which the second light modulation system modulates the supplementary light in the embodiment shown in FIG. 2 and in the present embodiment. Further, in the present disclosure, when the projection display system is in a working state, the supplementary light source and the first light source can be turned on and off synchronously, such that the supplementary light source and the first light source are in an on state at the same time, in order to enable the second light modulation system to modulate the supplementary light for a maximum period of time, thereby increasing the utilization rate of the supplementary light source.

The various embodiments in the present specification are described in a progressive manner, and each embodiment focuses on differences from other embodiments, and the same and similar parts between the various embodiments may be referred to each other.

The above contents are only embodiments of the present disclosure and are not intended to limit the scope of the disclosure. All the equivalent structure or equivalent process transformation made according to the specification and the drawings of the present disclosure or those directly or indirectly applied to other related technical field are equally included in the patent scope of the present disclosure.

What is claimed is:

1. A projection display system, comprising:
   a first light source configured to emit a first light;
   a first light modulation system configured to receive the first light and modulate the first light into a first image light;
   a supplementary light source configured to emit at least a supplementary light, a spectrum of the first light comprising a spectrum of the supplementary light;
   a second light modulation system configured to receive the supplementary light and modulate the supplementary light into a supplementary image light;
   a light combining device positioned in an emergent light path of the first light modulation system and an emergent light path of the second light modulation system, and configured to combine the first image light and the supplementary image light, a beam cross-sectional area of the first image light being greater than a beam cross-sectional area of the supplementary image light at a light combining position; and
   a projection lens system positioned in the emergent light path of the first light modulation system and the emergent light path of the second light modulation system, and configured to image and overlap the first image light and the supplementary image light at a predetermined position.

2. The projection display system according to claim 1, wherein a divergence angle of the supplementary light at an incident position of the second light modulation system is smaller than a divergence angle of the first light at an incident position of the first light modulation system.

3. The projection display system according to claim 1, wherein the supplementary light source is a laser light source.

4. The projection display system according to claim 1, wherein a divergence angle of the supplementary light at an incident position of the second light modulation system is smaller than ⅕ of a divergence angle of the first light at an incident position of the first light modulation system.

5. The projection display system according to claim 1, wherein the first light is a sequential light having a spectrum that changes with time.

6. The projection display system according to claim 1, wherein the first light is a non-sequential light having a spectrum that does not change with time.

7. The projection display system according to claim 1, wherein the first light is a white light, color coordinates of the white light deviate from a black body locus, and the supplementary light is a red light or a green light.

8. The projection display system according to claim 1, wherein the supplementary light source and the first light source are synchronously turned on and off when the projection display system is in a working state.

9. The projection display system according to claim 1, wherein the first light modulation system is a light modulation system of a digital micromirror device type, and the second light modulation system is a light modulation system of a liquid crystal light valve type; or the second light modulation system is a light modulation system of the digital micromirror device type, and the first light modulation system is a light modulation system of the liquid crystal light valve type.

10. The projection display system according to claim 1, wherein the projection lens system comprises a first projection lens positioned in the emergent light path of the first light modulation system and configured to image the first image light to the predetermined position;

the projection lens system further comprises a second projection lens positioned in the emergent light path of the second light modulation system and configured to image the supplementary image light to the predetermined position; and the light combining device is positioned in an emergent light path of the first projection lens and an emergent light path of the second projection lens.

11. The projection display system according to claim 10, wherein a maximum diameter of the first projection lens is greater than a maximum diameter of the second projection lens.

12. The projection display system according to claim 1, wherein the projection lens system comprises a third projection lens positioned in an emergent light path of the light combining device and configured to image the first image light and the supplementary image light to the predetermined position.

13. The projection display system according to claim 1, wherein the projection lens system comprises a first front group lens, a second front group lens, and a rear group lens;

the first front group lens and the rear group lens constitute a first lens that is positioned in the emergent light path of the first light modulation system and configured to image the first image light to the predetermined position;

the second front group lens and the rear group lens constitute a second lens that is positioned in the emergent light path of the second light modulation system and configured to image the supplementary image light to the predetermined position; and the light combining device is positioned between the first front group lens and the rear group lens and also between the second front group lens and the rear group lens.

14. The projection display system according to claim 13, wherein the light combining device is positioned at an aperture stop position of the first lens and the second lens.

15. The projection display system according to claim 1, wherein the light combining device is a regionally coated light splitter and comprises a first region and a second region, the first image light is incident on both the first region and the second region, and the supplementary image light is incident on the first region; and the second region is configured to transmit the first image light, the first region is configured to reflect the supplementary image light and transmit at least a portion of the first image light, and a spectrum of the first image light transmitted by the first region does not overlap with a spectrum of the supplementary image light; or the second region is configured to reflect the first image light, the first region is configured to transmit the supplementary image light and reflect at least a portion of the first image light, and a spectrum of the first image light reflected by the first region does not overlap with the spectrum of the supplementary image light.

16. The projection display system according to claim 1, wherein during display of one frame of image, the first light modulation system is configured to modulate a red light, a green light and a blue light respectively according to image data of the frame of image, and the second light modulation system is configured to modulate the supplementary light based on image data associated with a color of the supplementary light in the image data of the frame of image.

17. The projection display system according to claim 1, wherein during display of one frame of image, modulation time of the second light modulation system for the supplementary light equals to a sum of modulation time of the first light modulation system for the first light.

* * * * *